United States Patent [19]
Kato et al.

[11] Patent Number: 5,409,681
[45] Date of Patent: Apr. 25, 1995

[54] CATALYST FOR PURIFYING EXHAUST GAS

[75] Inventors: Yasuyoshi Kato; Kunihiko Konishi; Fumito Nakajima; Ikuhisa Hamada; Isato Morita, all of Kure, Japan

[73] Assignee: Babcock-Hitachi Kabushiki Kaisha, Japan

[21] Appl. No.: 980,182

[22] Filed: Nov. 23, 1992

[30] Foreign Application Priority Data

Nov. 27, 1991 [JP] Japan .................. 3-312308
May 29, 1992 [JP] Japan .................. 4-138514

[51] Int. Cl.6 ................... B01J 8/00; B01J 21/04
[52] U.S. Cl. .................... 423/239.1; 502/305; 502/309; 502/312; 502/313; 502/326; 502/350; 502/353
[58] Field of Search ............ 423/239, 239 A; 502/305, 309, 312, 313, 326, 350, 353

[56] References Cited

U.S. PATENT DOCUMENTS

| | | | |
|---|---|---|---|
| 3,839,225 | 10/1974 | Acres | 252/432 |
| 3,963,827 | 6/1976 | Acres et al. | 423/239 |
| 4,085,193 | 4/1978 | Nakajima et al. | 423/239 |
| 4,333,855 | 6/1982 | Gardner et al. | 252/439 |
| 4,466,947 | 8/1984 | Imanari et al. | 423/239 |
| 4,959,439 | 8/1989 | Rikimaru et al. | 423/239 |
| 5,049,364 | 9/1991 | Yoshimoto et al. | 423/239 |
| 5,128,305 | 7/1992 | Yoshimoto et al. | 502/243 |
| 5,292,704 | 3/1994 | Lester | 502/309 |

FOREIGN PATENT DOCUMENTS

| | | |
|---|---|---|
| 0070736 | 1/1983 | European Pat. Off. . |
| 0174495 | 3/1986 | European Pat. Off. . |
| 0208434 | 1/1987 | European Pat. Off. ..... B01D 53/36 |
| 0255121 | 2/1988 | European Pat. Off. . |
| 0365308 | 4/1990 | European Pat. Off. . |
| 50-128681 | 10/1975 | Japan . |
| 52-43767 | 4/1977 | Japan . |
| 2-191527 | 7/1990 | Japan . |
| 4-59054 | 2/1992 | Japan . |
| 2006038 | 5/1979 | United Kingdom . |

Primary Examiner—Wayne Langel
Assistant Examiner—Thomas G. Dunn, Jr.

[57] ABSTRACT

A catalyst for purifying an exhaust gas includes a first component having activity for reducing nitrogen oxides with ammonia and a second component having at least one of activity for forming nitrogen oxide from ammonia and activity for forming carbon dioxide from carbon monoxide. The first component is a composition containing an oxide of at least one member selected from titanium, vanadium, tungsten and molybdenum and the second component is a composition containing a salt of a noble metal selected from platinum, palladium and rhodium or any one of these noble metals supported on a porous material selected from zeolites, alumina and silica. The invention further provides a method for purifying an exhaust gas containing NOx, CO and leak $NH_3$ using the catalyst.

14 Claims, 7 Drawing Sheets

CATALYST FOR PURIFYING EXHAUST GAS

FIELD OF THE INVENTION

The present invention relates to a catalyst for purifying an exhaust gas and a method of purifying an exhaust gas with the catalyst. In particular, it relates to a catalyst suitable for removing nitrogen oxides (NOx) contained in an exhaust gas and an exhaust gas containing ammonia ($NH_3$) or carbon monoxide (CO), and a method of purifying an exhaust gas with the catalyst.

PRIOR ART

NOx in flue gases from power plants, various other plants and automobiles is a substance which causes photochemical smog and acid rain. Mainly in power plants, a method of removing NOx in flue-gas by selective catalytic reduction using $NH_3$ as a reducing agent is widely used as an effective NOx removal method. As a catalyst, there is used a titanium oxide ($TiO_2$)-based catalyst containing vanadium (V), molybdenum (Mo) or tungsten (W) as an active component. In particular, a titanium oxide-based catalyst containing vanadium as one of the active components is currently a mainstream NOx removal catalyst, since it not only has high activity but also is less susceptible to deterioration by impurities contained in an exhaust gas and can be used even at a low temperature (JP-A-50-128681).

To cope with an increase in power demand in recent years, particularly with an increase in power demand in summer, an increasing number of gas turbines or cogeneration systems using gas turbines are used mainly around urban centers. These facilities are often constructed around areas with a concentration of population, and the area level of nitrogen oxides (NOx) must be controlled. It is therefore desired to keep the amount of NOx exhausted from the facilities at the lowest level possible.

For this reason, methods in which NOx removal apparatus is operated at a high NOx removal rate by increasing the amount of a packed catalyst and increasing the amount of ammonia charged as a reducing agent have been studied.

With such a high-rate NOx removal, it is essential to decrease the amount of unreacted ammonia not consumed in the NOx removal reaction (hereinafter referred to as leak ammonia) to a level equal to or below the NOx level. In order to decrease the amount of leak ammonia, it has been proposed to place an ammonia-decomposing catalyst downstream from a NOx removal catalyst (JP-A-2-191527). The catalyst for decomposing leak ammonia has also been studied, and there is known a catalyst containing, as an active component, copper (Cu) or iron (Fe) which has excellent ammonia oxidizing activity (JP-A-52-43767).

In addition to the above NOx and $NH_3$, it is also desired to control CO contained in a combustion exhaust gas to a low level. Gas turbine operations in U.S.A. have widely employed a method in which a platinum (Pt)-based catalyst is placed upstream of the NOx removal apparatus to remove CO contained in an exhaust gas by oxidizing it.

Further, it is desired to remove not only NOx emitted from a combustion device but also CO and $NH_3$ emitted from various plants until their amounts are decreased to the lowest level possible. Therefore, a need exists to develop a catalyst and a process which can remove NOx, $NH_3$ and CO at the same time.

The above prior art techniques for the removal of NOx and CO from an exhaust gas require a plurality of layers of packed catalysts, and processes for their use are complicated.

Figure 5A:
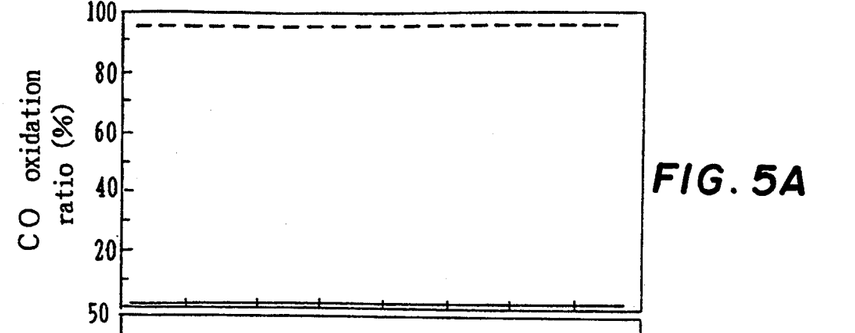
FIG. 5 is a series of graphs showing behaviors of NOx and ammonia at the outlet of a NOx removal apparatus using a conventional catalyst and a catalyst of the present invention.
Figure 5B:
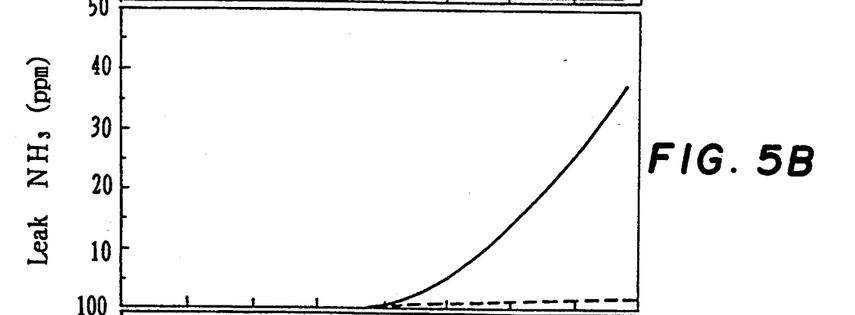
Figure 5C:
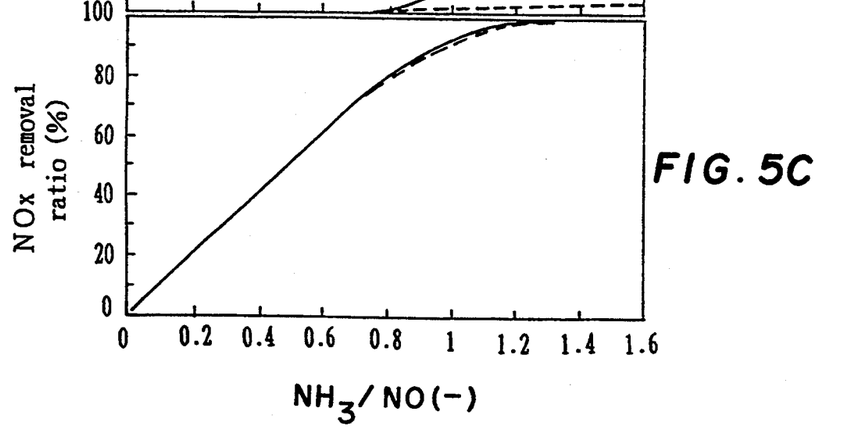

For example, for a NOx removal apparatus in which the amount of a packed NOx removal catalyst is increased for operation at a high NOx removal ratio and the amount of ammonia as a reducing agent is increased, there is the problem that the amount of leak ammonia increases. That is, as is shown by solid lines in FIG. 5, which shows behaviors of NOx concentration and leak ammonia concentration at a catalyst reactor outlet when a NOx removal apparatus is operated with various $NH_3$/NOx ratios. As seen in FIG. 5, a high NOx removal ratio can be obtained when the apparatus is operated at a $NH_3$/NOx ratio of nearly 1, while the amount of leak ammonia sharply increases as the $NH_3$/NOx ratio approaches 1. In this case, since the NOx removal apparatus has no capability of oxidizing CO, no CO in an exhaust gas is oxidized, as is shown by a solid line in FIG. 5.

Figure 6:
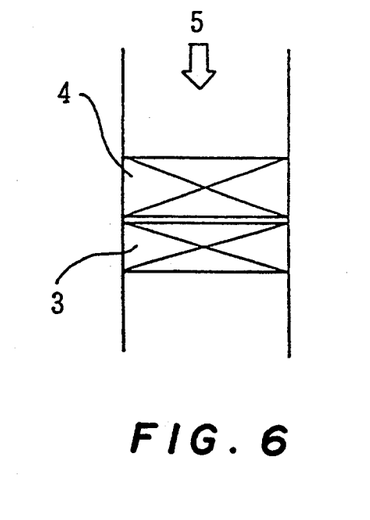
FIG. 6 shows apparatus using a NOx removal catalyst and an ammonia-decomposing catalyst as two layers.
Figure 7A:
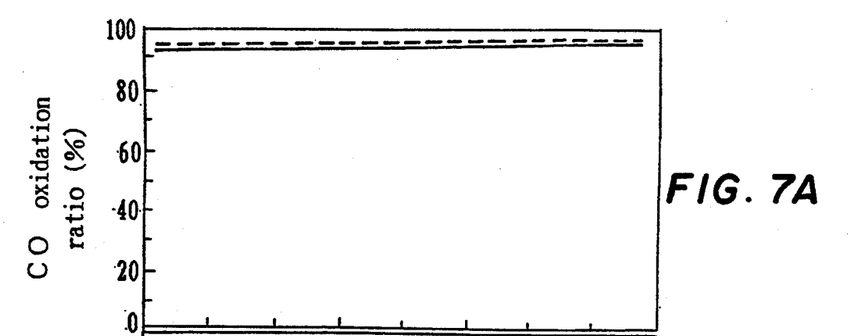
FIG. 7 is a series of graphs illustrating problems caused when a NOx removal catalyst and an ammonia-decomposing catalyst are used as two layers.
Figure 7B:
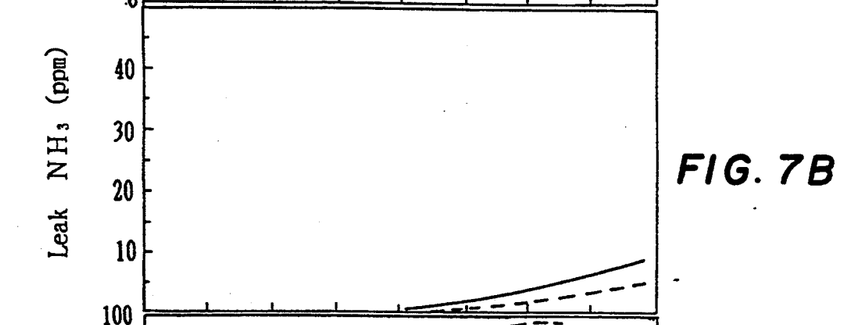
Figure 7C:
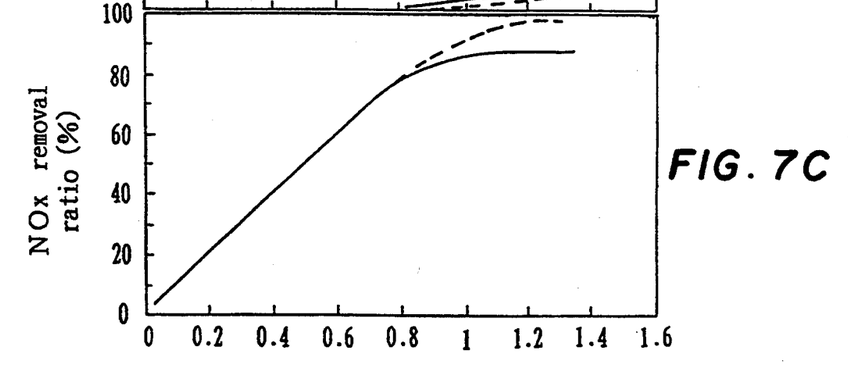

FIG. 6 illustrates an apparatus having two catalyst layers, one for decreasing leak ammonia, in which a conventional NOx removal catalyst is placed upstream of a conventional ammonia-decomposing catalyst. While such an apparatus decreases the amount of leak ammonia as compared with the case shown in FIG. 5, as the $NH_3$/NOx ratio is increased, a side reaction takes place to form NO by decomposition of $NH_3$ by oxidation, as shown in the following reaction scheme (1), and no high NOx removal level can be obtained, as is shown by a solid line in FIG. 7.

$$NH_3 + 5/4 O_2 \rightarrow NO + 3/2 H_2O \qquad (1)$$

As described above, in merely employing the above method in which the amount of a packed NOx removal catalyst is increased and an ammonia-decomposing catalyst is placed in a downstream thereto for preventing the leak of unreacted ammonia, many catalysts for decomposing $NH_3$ produce NOx as a byproduct and are liable to decrease the NOx removal ratio to low levels, depending on the amount of $NH_3$ and gas conditions.

On the other hand, in the apparatus for the removal of CO and NOx in which a catalyst for oxidizing CO is placed upstream of a NOx removal catalyst, a CO oxidation reactor is required to be separated from the NOx removal reactor in order to avoid the oxidation of $NH_3$ with the catalyst for oxidizing CO. Moreover, since the optimum reaction temperature differs between a CO oxidation reaction and a NOx removal reaction, the system is complicated and expensive.

SUMMARY OF THE INVENTION

The present invention has been made in view of the above background, and has as its objective, provision of a novel catalyst having high activity for reactions to remove NOx, CO and $NH_3$ so that the following criteria for purifying an exhaust gas can be realized;

(i) the apparatus has hardly any leak of $NH_3$,
(ii) the apparatus can remove both CO and NOx, and
(iii) the apparatus can convert $NH_3$ to harmless nitrogen.

To achieve the above objective, the present invention is first directed to a catalyst for purifying an exhaust gas, which includes a first component having activity for reducing nitrogen oxides with ammonia and a second component having activity for forming nitrogen oxide from ammonia and/or activity for forming carbon dioxide from carbon monoxide.

The above catalyst can be used as a NOx removal catalyst for not only catalytically reducing nitrogen oxides but also decomposing unreacted ammonia.

The first component is a composition containing an oxide of at least one element selected from titanium (Ti), vanadium (V), tungsten (W) and molybdenum (Mo). The second component is a composition containing a salt of a noble metal selected from platinum (Pt), palladium (Pd) and rhodium (Rh) or any one of these noble metals preliminarily supported on a porous carrier of zeolite, alumina or silica.

More specifically, the above catalyst can be obtained by mixing the first and second components described below in such amounts that the noble metal concentration is 1,000 ppm or less, adding water to the resultant mixture, kneading the mixture, shaping the mixture to a plate-like, honeycomb-like or particulate form by a conventional method and calcining the shaped mixture at a predetermined temperature.

(A) The first component is a composition having NOx removal activity and containing an oxide of any combination of Ti-V, Ti-Mo, Ti-W, Ti-V-W, Ti-Mo-V or Ti-W-Mo or a zeolite such as mordenite carrying copper (Cu) or iron (Fe).

(B) The second component is a composition having the function of forming NOx by oxidizing $NH_3$ with oxygen, and containing a noble metal salt such as chloroplatinic acid, palladium nitrate or rhodium chloride, or any one of these noble metals preliminarily supported on a zeolite, porous silica or porous alumina by ion exchange and impregnation.

The second component/first component mixing ratio by weight is preferably 1/99 to 10/90.

The present invention is also directed to a method of purifying an exhaust gas, which uses the above catalyst as a catalyst for decomposing nitrogen oxides or nitrogen oxides and carbon monoxide in the exhaust gas and for decomposing unreacted ammonia remaining from that ammonia injected into the exhaust gas as an agent for reducing the nitrogen oxides. In an alternative embodiment of the invention, the above catalyst is placed downstream of a NOx removal catalyst for removing, by catalytic reduction, nitrogen oxides in an exhaust gas containing nitrogen oxides or nitrogen oxides and carbon monoxide and further containing ammonia injected into the exhaust gas as an agent for reducing the nitrogen oxides, to decompose and remove unreacted ammonia or unreacted ammonia and carbon monoxide remaining in the exhaust gas.

Figure 1:
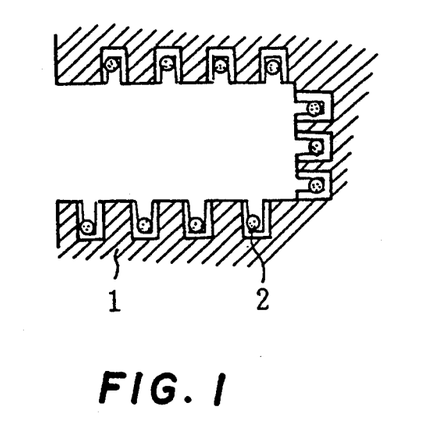
FIG. 1 is a schematic cross-sectional view of a catalyst of the present invention showing its characteristic features.

FIG. 1 schematically shows pores of a catalyst according to the present invention, which a NOx removal catalyst component (first component) 1 provides macropores and a porous material such as zeolite, etc., forms micropores in some of the macropores. A noble metal-containing component (second component) 2 is accessible through the micropores.

Figure 2:
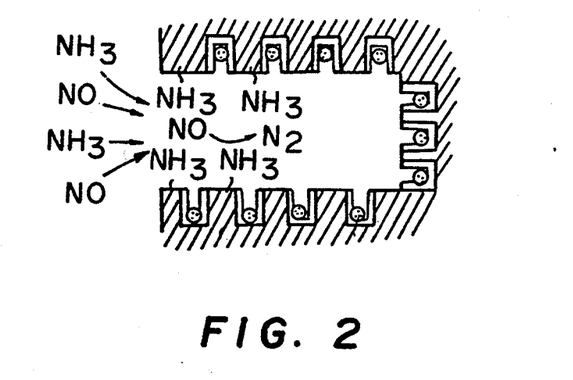
FIG. 2 is a schematic view of a catalyst of the present invention illustrating its activity in the reaction of NO with ammonia.

In the above structure, ammonia which is easily adsorbed on a NOx removal catalyst component is selectively adsorbed on the NOx removal catalyst component 1 at the inlet to the macropore, and consumed there by reaction with NOx being diffused as shown in FIG. 2. Due to this, ammonia does not reach the noble metal-containing component (second component) 2 having high diffusion resistance and located in the micropores, and exhibits a high NOx removal ratio like a general NOx removal catalyst.

On the other hand, when adsorbed ammonia is no longer consumed due to a decrease in NOx, the ammonia diffuses into the micropores to reach the second component 2. Further, when an exhaust gas contains ammonia alone, the following oxidation reactions occur:

$$NH_3 + 5/4O_2 \rightarrow NO + 3/2H_2O \qquad (1)$$

$$NO + NH_3 + 1/4O_2 \rightarrow N_2 + 3/2H_2O \qquad (2)$$

Figure 3:
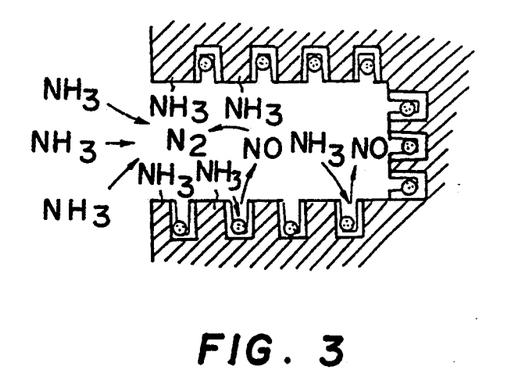
FIG. 3 is a schematic view of a catalyst of the present invention illustrating its activity in the decomposition of ammonia.

That is, NO generated according to the reaction (1) diffuses from the micropores into the macropore or escapes the catalyst shown in FIG. 3, and in so doing, the NO comes into contact with ammonia adsorbed on the inner surface of the macropore to be reduced to nitrogen by reaction (2).

As described above, the catalyst of the present invention neither forms NO nor decreases the NOx removal ratio when the above catalyst is used in a NOx removal apparatus using $NH_3$ as a reducing agent. Further, another big advantage of the catalyst of the present invention is that the amount of leak ammonia from the catalyst layer can be decreased even when an excess amount of $NH_3$ is added.

Further, the catalyst of the present invention can efficiently decompose $NH_3$ into $N_2$ by oxidation when it is used for purifying an ammonia-containing exhaust gas, and can serve in a variety of apparatus for preventing offensive odors.

Figure 4:
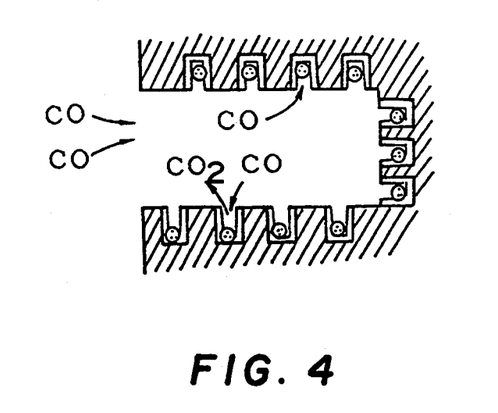
FIG. 4 is a schematic view of a catalyst of the present invention illustrating its activity in the oxidation of CO to $CO_2$.

Moreover, since CO contained in an exhaust gas is, by its nature, easily diffused into catalyst pores, it rapidly comes in contact with an oxidizing catalyst component as shown in FIG. 4 to be oxidized into $CO_2$ according to the following reaction (3).

$$CO + 1/2O_2 \rightarrow CO_2 \qquad (3)$$

Therefore, the catalyst of the present invention has another big advantage in that it can carry out the purification of an exhaust gas by oxidizing and decomposing CO contained in the exhaust gas in addition to the NOx removal.

As described above, the catalyst according to the present invention is a novel three-function catalyst which works as an ordinary NOx removal catalyst when NOx is present, which can decompose ammonia into nitrogen by a combination of the activity of the noble metal-containing component (second component) 2 for catalytically oxidizing ammonia and the activity of the NOx removal component (first component) 1 when NOx has been consumed, leaving ammonia, and further which can also remove CO at the same time.

Therefore, when the catalyst of the present invention is used alone, the amount of leak ammonia, which constitutes a prior art problem since it increases as shown by a solid line in FIG. 5 when the $NH_3/NO$ ratio is increased, can be kept at a very low level as shown by a dotted line in FIG. 5, and at the same time, CO can be removed.

Further, when the catalyst 3 of the present invention is placed in the downstream position in a two-layered reactor shown in FIG. 6 (with a usual NOx removal catalyst 4 in the upstream position) to oxidize and decompose leak ammonia, no NOx is generated. Therefore, a decrease in the NOx removal ratio, which is a problem of a conventional catalyst for decomposing ammonia as shown by a solid line in FIG. 7, no longer occurs, and a high NOx removal ratio as shown by a dotted line in FIG. 7 can be obtained, while decreasing leak ammonia. In the prior art, a catalyst for decomposing ammonia is required as much as a NOx removal catalyst, while the catalyst of the present invention serves to decrease the required amount of a NOx removal catalyst since it works as a NOx removal catalyst when NOx is present, and as a result, the total amount of catalyst required can be appreciably decreased.

As described above, the catalyst of the present invention makes it possible to build a system which maintains a high NOx removal ratio and generates little leak ammonia, either using the catalyst alone or placing it downstream of a NOx removal catalyst.

Of course, the catalyst of the present invention can remove CO at the same time if carbon monoxide is present in the exhaust gas.

Further, when used for purifying a gas containing of $NH_3$ (e.g., an exhaust gas from a dizao copying machine), the catalyst of the present invention can efficiently decompose $NH_3$ into $N_2$.

The catalyst of the present invention can be produced by any preparation method provided the foregoing features can be realized. A catalyst which works excellently can be produced by the following method.

The first component is selected from any of the above-described to produce an excellent catalyst by the following method. Among the above-described first components, the use, as a catalyst component, of an oxide catalyst formed of any combination of Ti-V, Ti-V-Mo and Ti-W-V, etc. can produce a favorable result. This oxide catalyst can be obtained by adding an oxoacid salt of vanadium, molybdenum or tungsten to a slurry of hydrous titanium oxides such as metatitanic acid, etc., converting the resultant mixture to a paste while evaporating water with a heating kneader, drying the paste, calcining the resultant product at a temperature between 400° C. and 700° C. and optionally milling it.

The second component may be added by a method in which a soluble salt of the above noble metal is dissolved in water and the resultant solution is kneaded with a powder of the above first component to allow it to be held in micropores of the first component. However, it is preferred to employ a method in which the second component is preliminarily introduced into the micropores of a porous material such as zeolite, silica or alumina by ion-exchange or kneading and then the porous material holding the second component is added to the first component. The zeolite used as a carrier for the second component is a hydrogen-substituted type, sodium type or calcium type of zeolite selected from mordenite, clinoptilite, erionite and Y-type zeolite. The silica and alumina as a carrier are selected from those having a surface area of 100 $m^2/g$ to 500 $m^2/g$, obtained by calcining hydrous oxides at a low temperature. The particle size of these is approximately 1 to 10 $\mu m$. These may be milled before use to such an extent that the structure of zeolite, etc., is not destroyed.

The carrier is immersed in an aqueous solution containing a noble metal in the form of a chloride, a nitrate or an ammine complex for ion exchange, or evaporated to dryness together with an aqueous solution to obtain a powder supporting 0.01 wt % to 0.1 wt % of the noble metal, and the powder is used as a second component.

The so-obtained first and second components are mixed in a second component/first component mixing ratio in weight of 20/80 to 0.5/99.5, preferably 10/90 to 1/99. Then, known additives for shaping such as water, an inorganic binder, a shaping modifier and an inorganic fiber are added, and the resultant mixture is kneaded with a kneader to obtain a paste-like catalyst. The paste-like catalyst is shaped into a plate-like catalyst by applying it to a net-like substrate of an inorganic fiber or a metal plate whose surface is roughened by flame spraying, or shaped in the form of a column or honeycomb with an extruder.

The second component/first component mixing ratio is particularly important. When this ratio is greater than the above upper limit, NOx is generated and the NOx removal ratio decreases. When it is smaller than the above lower limit, the ammonia decomposition rate cannot be increased. In particular, a favorable result can be obtained when any one of zeolite, silica and alumina etc., which have high capability for supporting a noble metal, is used to decrease the second component/first component mixing ratio within the above range and when the amount of supported noble metal based on the total catalyst amount is greater than 0 ppm but not greater than 1,000 ppm, preferably in the range of from 10 to 100 ppm. In this case, as schematically shown in FIG. 1, micropores formed of the second component 2 are sparsely present in each macropore formed of the first component 1, and $NH_3$ is selectively adsorbed on the first component and easily consumed there in a NOx removal reaction.

Further, in addition to the economy realized by a decrease catalyst unit price, due to a decrease in the noble metal amount, there is also the advantage that the NOx removal reaction and the ammonia oxidation can be easily separated depending upon the presence or absence of NO.

Furthermore, when the catalyst of the present invention is used alone, it is preferred to decrease the second component/first component mixing ratio within the specified range, to obtain a favorable result. When it is used in a two-layered reactor as shown in FIG. 6, it is preferred to increase the second component/first component mixing ratio within the specified range and increase the noble metal content, to obtain a favorable result.

DESCRIPTION OF THE PREFERRED EMBODIMENTS

Sole use of the catalyst of the present invention reduces the leakage of unreacted ammonia to the lowest level possible when a NOx removal apparatus is operated at a high NH3/NOx ratio. Further, when carbon monoxide is contained in an exhaust gas, the carbon monoxide can be removed by oxidation.

When the catalyst of the present invention is used to decompose unreacted ammonia (leak ammonia) by placing it downstream of a NOx removal catalyst having high activity, the leak of unreacted ammonia which would otherwise be caused by an unbalanced ammonia amount can be prevented, and CO harmful to the human body can be also removed. Therefore, there can be realized a multifunctional exhaust gas treatment process for use in NOx removal apparatus around urban centers.

Further, the catalyst of the present invention works as a NOx removal catalyst when NOx is present and it works as a catalyst for decomposing ammonia when NOx is absent. Moreover, when the catalyst of the present invention decomposes ammonia, NOx is hardly generated. Therefore, the catalyst of the present invention also has a characteristic feature in that the amount of the catalyst can be decreased to a great extent as compared with a case using two layers of a NOx removal catalyst and a conventional ammonia-decomposing catalyst.

The present invention will be explained in further detail by the following Examples.

EXAMPLE 1

3.59 kilograms of ammonium paratungstate [$(NH_4)_{10}H_{10}W_{12}O_{46}\cdot H_2O$] and 1.29 kg of ammonium metavanadate were added to 67 kg of a metatitanic acid slurry ($TiO_2$ content: 30 wt %, $SO_4$ content: 8 wt %), and the resultant mixture was kneaded with a heating kneader while evaporating water to obtain a paste having a water content of 36%. The paste was extruded in the form of 3 mm$\phi$ columns, granulated, dried with a fluidized dryer, and then calcined in air at 550° C. for 2 hours. The resultant granules were milled with a hammer mill to reduce at least 60% to a powder having a particle size of 1 $\mu$m to give a NOx removal catalyst powder as a first component. This powder had a V/W/Ti composition of 4/5/91 (atomic ratio).

On the other hand, 500 g of H type mordenite having an Si/Al atomic ratio of about 21 and an average particle size of about 10 $\mu$m was added to a solution of 0.665 g of chloroplatinic acid ($H_2[PtCl_6]\cdot 6H_2O$) in 1 liter of water, and the resultant mixture was evaporated to dryness over a sand bath to produce mordenite supporting Pt. The resultant product was dried at 180° C. for 2 hours and calcined in atmospheric air at 500° C. for 2 hours to prepare 0.05 wt % Pt-mordenite as a second component.

Separately, net-like fabrics each prepared by plain-weaving twist yarns each consisting of 1,400 E glass fibers having a fiber diameter of 9 $\mu$m in a texture coarseness of 10 yarns/inch were impregnated with a slurry containing 40% of titania, 20% of silica sol and 1% of polyvinyl alcohol, and dried at 150° C. to obtain stiff catalyst substrates.

5.3 Kilograms of a silica alumina-based inorganic fiber and 17 kg of water were added to 20 kg of the first component and 408 g of the second component, and the resultant mixture was kneaded with a kneader to obtain a catalyst paste. This catalyst paste was placed between the two above catalyst substrates, and the resultant laminate was passed through a press roll to attach the catalyst to the interstitial areas and surface of the substrates under pressure, whereby a plate-like catalyst having a thickness of about 1 mm was obtained. The catalyst was dried at 180° C. for 2 hours, and calcined in air at 500° C. for 2 hours. The catalyst had a second component/first component ratio of 2/98 and a Pt content of 10 ppm when the catalyst substrate and the inorganic fiber were excluded.

COMPARATIVE EXAMPLE 1

A catalyst was prepared in the same manner as in Example 1 except that no second component was added.

COMPARATIVE EXAMPLE 2

A catalyst was prepared in the same manner as in Example 1 except that the first component was replaced with titania produced by a chlorine method (trade name: CR50, supplied by Ishihara Sangyo Kabushiki Kaisha).

TEST EXAMPLE 1

Figure 8A:
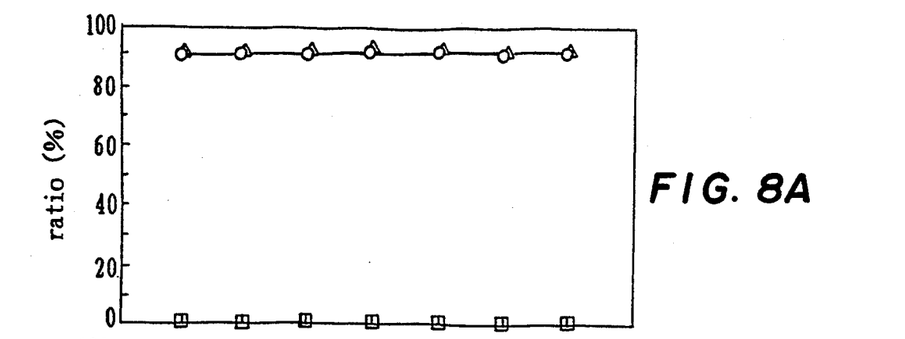
FIG. 8 is a series of graphs comparing CO-decomposing performance, NOx removal performance and amount of unreacted NH3 for the catalysts prepared in Example 1 and Comparative Examples 1 and 2.
Figure 8B:
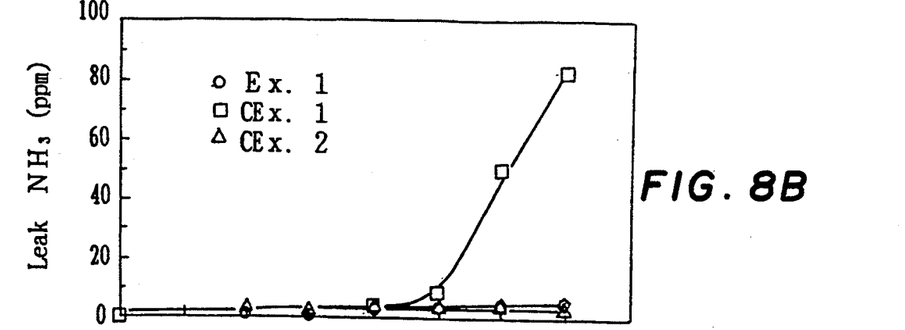
Figure 8C:
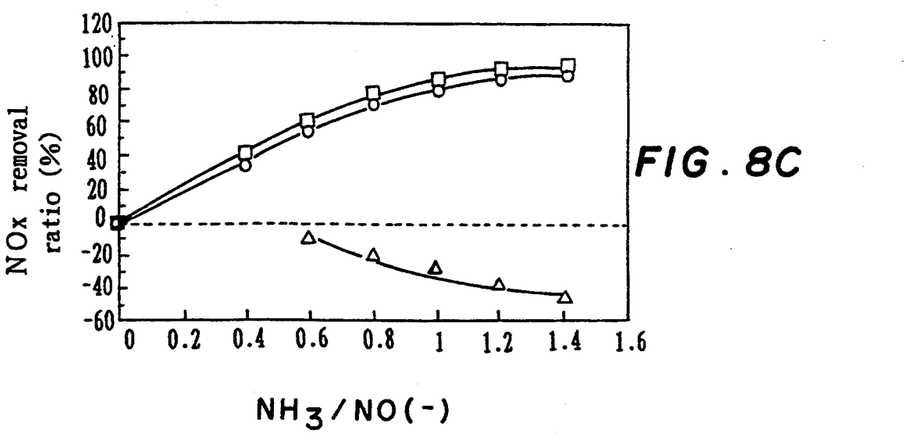

The catalysts obtained in Example 1, Comparative Example 1 and Comparative Example 2 were respectively cut to sheets having a width of 20 mm and a length of 100 mm. Three sheets taken from each catalyst were packed in a reactor at intervals of 3 mm, and measured for a NOx removal ratio, amount of unreacted ammonia at the reactor outlet and CO oxidation ratio with various amounts of ammonia amount feed as shown in Table 1. FIG. 8 shows the results.

TABLE 1

| Component | Content |
|---|---|
| NO | 200 ppm |
| NH3 | varied |
| CO | 200 ppm |
| O2 | 10% |
| H2O | 6% |
| CO2 | 6% |
| SO2 | 2 ppm |
| gas amount | 180 liters/h |
| temperature | 350° C. |
| area velocity (AV) | 17 m/h |

As shown in FIG. 8, the catalyst of Example 1 showed a high CO oxidation ratio and yet showed a NOx removal ratio equivalent to that of the catalyst formed of the NOx removal component alone, prepared in Comparative Example 1, when the ammonia amount was increased to increase the NH3/NO ratio. Further, when the catalyst of Example 1 was used, the ammonia concentration in the reactor outlet was as low as one digit number in ppm. In contrast, when the catalyst of Comparative Example 1 was used, CO was hardly oxidized, and an increasingly high concentration of ammonia was detected in the reactor outlet as the NH3/NO ratio increased. On the other hand, when the titania-containing catalyst of Comparative Example 2, which contained the second component but had no NOx removal activity, was used, the CO oxidation ratio was high, and the NH3 concentration in the reactor outlet was low. However, it showed negative values for NOx removal ratio. In this case, the CO oxidation ratio was high as shown in FIG. 8.

As is clear from the above results, the catalyst according to this Example of the present invention is an excellent catalyst due to synergism of the first component and the second component. It shows a high NOx removal ratio equivalent to that of a conventional NOx removal catalyst when the NH3/NO ratio is low, shows a decrease in residual ammonia without generating NOx when NOx is consumed by the NOx removal reaction and simultaneously decomposes CO.

EXAMPLE 2 AND 3

A second component was prepared in the same manner as in Example 1 except that the H type mordenite was replaced with fine silica particles (trade name: Mycon-F, supplied by Tomita Pharmaceutical Kabushiki Kaisha) (Example 2) or with γ-alumina particles (Sumitomo Chemical Kabushiki Kaisha) (Example 3). Then, catalysts were prepared in the same manner as in Example 1 in a second component/first component mixing ratio of 2/98 except that the second component was replaced with the above-prepared second components.

EXAMPLE 4

A catalyst was prepared in the same manner as in Example 2 except that the second component was replaced with 833 ml of a chloroplatinic acid aqueous solution (Pt concentration: 1.2 mg/ml).

EXAMPLE 5

A catalyst was prepared in the same manner as in Example 2 except that the ammonium paratungstate used in the preparation of the first component was replaced with ammonium paramolybdate [$(NH_4)_6 Mo_7O_{24} \cdot 4H_2O$].

EXAMPLES 6 AND 7

A mordenite supporting palladium or rhodium in an amount of 0.05 wt % was prepared in the same manner as in Example 2 except that the chloroplatinic acid was replaced with a nitric acid solution of palladium nitrate [$Pd(NO3)31$] (Example 6) or with a nitric acid solution of rhodium nitrate [$Rh(NO3)3$] (Example 7). Catalysts were prepared by respectively adding the above-prepared products to the first component prepared in the same manner as in the preparation of Pt-mordenite.

EXAMPLES 8–10

Catalysts were prepared in the same manner as in Example 2 except that the second component/first component ratio was changed from 2/98 to 0.5/99.5, 1/9 and 2/8.

EXAMPLES 11–13

A second component was prepared in the same manner as in Example 2 except that the amount of chloroplatinic acid was changed to 2.66 g. Then catalysts were prepared in the same manner as in Example 2 except that the second component/first component ratio was changed as in Examples 8 to 10.

COMPARATIVE EXAMPLE 3

A catalyst was prepared in the same manner as in Example 5 except that no second component was added.

COMPARATIVE EXAMPLES 4–7

Catalysts were prepared in the same manner as in Examples 2, 3, 6 and 7 except that each of the first components was replaced with the same titania as that used in Comparative Example 3.

TEST EXAMPLE 2

The catalysts prepared in Examples 1 to 13 and Comparative Examples 1 to 7 were tested for NOx removal ratios, unreacted ammonia decomposition ratios and CO removal ratios under the conditions shown in Table 2. Tables 3 and 4 show the results. The unreacted ammonia decomposition ratio was determined by the following equation.

Ammonia decomposition ratio (%) = {($NH_3$ concentration in inlet − concentration of $NH_3$ used in reaction − $NH_3$ concentration in outlet) / ($NH_3$ concentration in inlet − concentration of $NH_3$ used in NOx removal reaction)} × 100.

TABLE 2

| Component | Content |
|---|---|
| NO | 200 ppm |
| NH3 | 280 ppm |
| CO | 200 ppm |
| O2 | 10% |
| H2O | 6% |
| CO2 | 6% |
| SO2 | 2 ppm |
| gas amount | 180 liters/h |
| temperature | 350° C. |
| area velocity (AV) | 17 m/h |

TABLE 3

| Catalyst | Second component | First component (atomic) ratio) | Mixing ratio (weight ratio) | Noble metal content (ppm) | NOx removal ratio | NH3 decomposition ratio | CO odixidation ratio |
|---|---|---|---|---|---|---|---|
| Ex. 1 | 0.05% Pt-mordenite | Ti/W/V = 91/5/4 | 2/98 | 10 | 96 | 94 | 92 |
| Ex. 2 | 0.05% Pt-silica | Ti/W/V = 91/5/4 | 2/98 | 10 | 93 | 98 | 97 |
| Ex. 3 | 0.05% Pt-γ-alumina | Ti/W/V = 91/5/4 | 2/98 | 10 | 88 | 42 | 68 |
| Ex. 4 | chloroplatinic acid | Ti/W/V = 91/5/4 | — | 50 | 96 | 65 | 18 |

TABLE 3-continued

| Catalyst | Second component | First component (atomic) ratio) | Mixing ratio (weight ratio) | Noble metal content (ppm) | Activities (%) NOx removal ratio | Activities (%) NH₃ decomposition ratio | Activities (%) CO odixidation ratio |
|---|---|---|---|---|---|---|---|
| Ex. 5 | 0.05% Pt-silica | Ti/Mo/V = 91/5/4 | 2/98 | 10 | 94 | 91 | 95 |
| Ex. 6 | 0.05% Pd-silica | Ti/W/V = 91/5/4 | 2/98 | 10 | 97 | 74 | 72 |
| Ex. 7 | 0.05% Rh-silica | Ti/W/V = 91/5/4 | 2/98 | 10 | 96 | 67 | 54 |
| Ex. 8 | 0.05% Pt-silica | Ti/W/V = 91/5/4 | 0.5/99.5 | 2.5 | 98 | 96 | 88 |
| Ex. 9 | 0.05% Pt-silica | Ti/W/V = 91/5/4 | 1/9 | 50 | 91 | 99 | 99 |
| Ex. 10 | 0.05% Pt-silica | Ti/W/V = 91/5/4 | 2/8 | 100 | 88 | 99 | 99 |

TABLE 4

| Catalyst | Second component | First component (atomic) ratio) | Mixing ratio (weight ratio) | Noble metal content (ppm) | Activities (%) NOx removal ratio | Activities (%) NH₃ decomposition ratio | Activities (%) CO odixidation ratio |
|---|---|---|---|---|---|---|---|
| Ex. 11 | 0.2% Pt-silica | Ti/W/V = 91/5/4 | 0.5/99.5 | 10 | 98 | 96 | 95 |
| Ex. 12 | 0.2% Pt-silica | Ti/W/V = 91/5/4 | 1/9 | 200 | 68 | 99 | 99 |
| Ex. 13 | 0.2% Pt-silica | Ti/W/V = 91/5/4 | 2/8 | 400 | 41 | 99 | 99 |
| CEx. 1 | — | Ti/W/V = 91/5/4 | — | 0 | 98 | 3 | 3 |
| CEx. 2 | 0.05% Pt-silica | inert TiO₂ | — | 10 | −52 | 98 | 98 |
| CEx. 3 | — | Ti/Mo/V = 91/5/4 | — | 0 | 96 | 2 | 1.8 |
| CEx. 4 | 0.05% Pt-silica | inert TiO₂ | 2/98 | 10 | −55 | 99 | 98 |
| CEx. 5 | 0.05% Pt-γ-alumina | inert TiO₂ | 2/98 | 10 | −38 | 79 | 77 |
| CEx. 6 | 0.05% Pd-silica | inert TiO₂ | 2/98 | 10 | −22 | 77 | 61 |
| CEx. 7 | 0.05% Rh-silica | inert TiO₂ | 2/98 | 10 | 13 | 64 | 32 |

Tables 3 and 4 clearly show that the catalysts obtained in Examples of the present invention showed high NOx removal ratios, high ammonia decomposition ratios and CO oxidation ratios as compared with the catalysts obtained in Comparative Examples. Thus, the catalysts according the present invention have excellent capability for NOx removal and CO oxidation while preventing the leak of unreacted ammonia.

TEST EXAMPLE 3

The catalysts obtained in Examples 1 to 13 and Comparative Examples 1 to 7 were measured for ammonia decomposition ratios in the absence of NO, and NOx concentrations were measured, under the conditions shown in Table 2 except that the NO concentration was changed to 0 ppm. Tables 5 and 6 show the results.

The ammonia decomposition ratio was determined by the following equation.

Ammonia decomposition ratio (%) = {(NH₃ concentration in reactor inlet − NH₃ concentration in reactor outlet) / NH₃ concentration in reactor inlet} × 100

TABLE 5

| Catalyst | Second component | First component (atomic ratio) | Mixing ratio (weight ratio) | Noble metal content (ppm) | NH₃ decomposition ratio (%) | Generated NOx (ppm) |
|---|---|---|---|---|---|---|
| Ex. 1 | 0.05% Pt-mordenite | Ti/W/V = 91/5/4 | 2/98 | 10 | 97 | 0.5 |
| Ex. 2 | 0.05% Pt-silica | Ti/W/V = 91/5/4 | 2/98 | 10 | 99 | 0.1 |
| Ex. 3 | 0.05% Pt-γ-alumina | Ti/W/V = 91/5/4 | 2/98 | 10 | 63 | 3.8 |
| Ex. 4 | chloroplatinic acid | Ti/W/V = 91/5/4 | — | 50 | 65 | 2.0 |
| Ex. 5 | 0.05% Pt-silica | Ti/Mo/V = 91/5/4 | 2/98 | 10 | 91 | 0.3 |
| Ex. 6 | 0.05% Pd-silica | Ti/W/V = 91/5/4 | 2/98 | 10 | 74 | 0.8 |
| Ex. 7 | 0.05% Rh- | Ti/W/V = | 2/98 | 10 | 67 | 0.7 |

TABLE 5-continued

| Catalyst | Second component | First component (atomic ratio) | Mixing ratio (weight ratio) | Noble metal content (ppm) | NH3 decomposition ratio (%) | Generated NOx (ppm) |
|---|---|---|---|---|---|---|
| Ex. 8 | 0.05% Pt-silica | Ti/W/V = 91/5/4 | 0.5/99.5 | 2.5 | 98 | 0.2 |
| Ex. 9 | 0.05% Pt-silica | Ti/W/V = 91/5/4 | 1/9 | 50 | 99 | 1.1 |
| Ex. 10 | 0.05% Pt-silica | Ti/W/V = 91/5/4 | 2/8 | 100 | 99 | 2.3 |

TABLE 6

| Catalyst | Second component | First component (atomic ratio) | Mixing ratio (weight ratio) | Noble metal content (ppm) | NH3 decomposition ratio (%) | Generated NOx (ppm) |
|---|---|---|---|---|---|---|
| Ex. 11 | 0.02% Pt-silica | Ti/W/V = 91/5/4 | 0.5/99.5 | 10 | 96 | 0.9 |
| Ex. 12 | 0.02% Pt-silica | Ti/W/V = 91/5/4 | 1/9 | 200 | 99 | 2.8 |
| Ex. 13 | 0.02% Pt-silica | Ti/W/V = 91/5/4 | 2/8 | 400 | 99 | 5.0 |
| CEx. 1 | — | Ti/W/V = 91/5/4 | — | 0 | 3 | 0.6 |
| CEx. 2 | 0.05% Pt-mordenite | inert TiO$_2$ | — | 10 | 98 | 120 |
| CEx. 3 | — | Ti/W/V = 91/5/4 | — | 0 | 2 | 1.8 |
| CEx. 4 | 0.05% Pt-silica | inert TiO$_2$ | 2/98 | 10 | 99 | 135 |
| CEx. 5 | 0.05% Pt-γ-alumina | inert TiO$_2$ | 2/98 | 10 | 79 | 103 |
| CEx. 6 | 0.05% Pd-silica | inert TiO$_2$ | 2/98 | 10 | 77 | 125 |
| CEx. 7 | 0.05% Rh-silica | inert TiO$_2$ | 2/98 | 10 | 64 | 48 |

Tables 5 and 6 clearly show that the catalysts obtained in Examples of the present invention showed high ammonia decomposition ratios as compared with the catalysts obtained in Comparative Examples, and were excellent catalysts free from NOx generation caused by ammonia decomposition.

TEST EXAMPLE 4

The catalysts obtained in Example 1, Comparative Example 1 and Comparative Example 2 were respectively cut to sheets having a width of 20 mm and a length of 100 mm. Three sheets taken from each catalyst were packed in a reactor at intervals of 3 mm, and measured for a NOx removal ratio, unreacted ammonia amount at the reactor outlet and CO oxidation ratio with the amounts of ammonia varied as shown in Table 7. Differing from the gas treated in Test Examples 1 and 2, the gas treated in this Test Example 4 contained no CO.

TABLE 7

| Component | Content |
|---|---|
| NO | 200 ppm |
| NH$_3$ | varied |
| O$_2$ | 10% |
| H$_2$O | 6% |
| CO$_2$ | 6% |
| SO$_2$ | 2 ppm |
| gas amount | 180 liters/h |
| temperature | 350° C. |
| area velocity (AV) | 17 m/h |

Figure 9A:
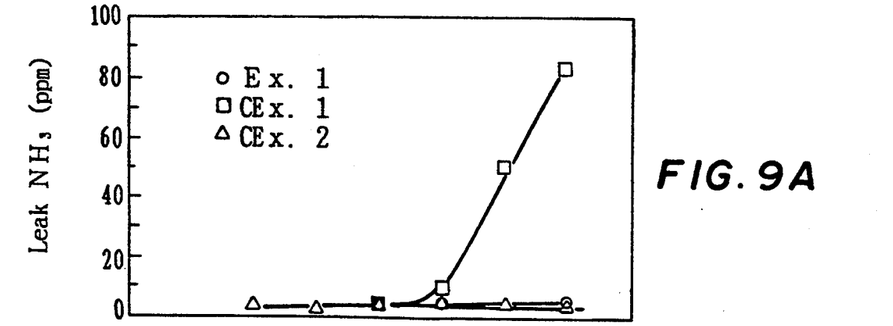
FIG. 9 shows comparisons of NOx removal performance, amount of unreacted NH3 among the catalysts prepared in Example 1 and Comparative Examples 1 and 2.
Figure 9B:
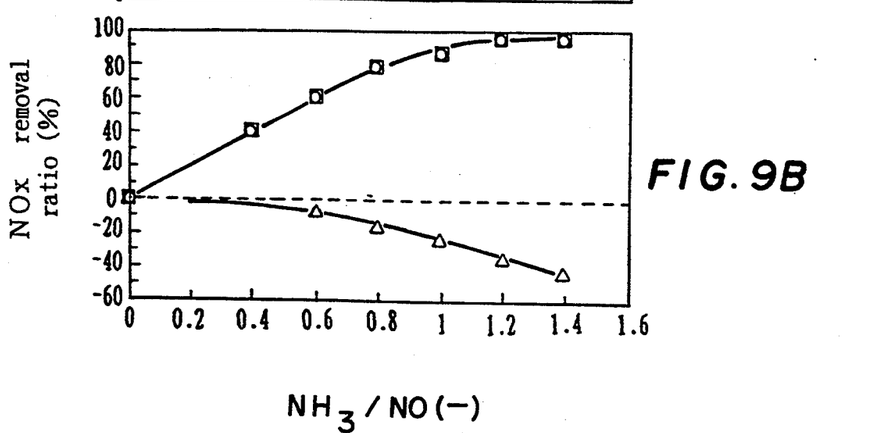

FIG. 9 shows the results.

As shown in FIG. 9, when the catalyst of Example 1 was used, the NOx removal ratio was equivalent to that of the catalyst formed of the NOx removal component alone, prepared in Comparative Example 1, when the ammonia amount was increased to increase the NH3/NO ratio, and yet the ammonia concentration in the reactor outlet was as low as one-digit value in ppm. In contrast, when the catalyst of Comparative Example 1 was used, an increasingly high concentration of ammonia was detected in the reactor outlet as the NH3/NO ratio increased. On the other hand, when the catalyst of Comparative Example 2, which contained the second component but contained titania having no NOx removal activity, was used, the NH$_3$ concentration in the reactor outlet was low, and yet it generated a large amount of NOx and showed negative values for the NOx removal ratio.

As is clear from the above results, the catalyst according to Example 1 of the present invention is an excellent catalyst due to synergistic effects of the first component and the second component, which shows a high NOx removal ratio equivalent to that of a conventional NOx removal catalyst when the NH3/NO ratio is low, and which can decrease residual ammonia without generating NOx when NOx is consumed by the NOx removal reaction.

EXAMPLES 14 AND 15

A second component was prepared in the same manner as in Example 1 except that the H type mordenite was replaced with fine silica particles (trade name: Mycon-F, supplied by Tomita Pharmaceutical Kabushiki Kaisha) (Example 14) or with -alumina particles (Sumitomo Chemical Kabushiki Kaisha) (Example 15).

Then, catalysts were prepared in the same manner as in Example 1 in a second component/first component mixing ratio of 1/9 except that the second component was replaced with the above-prepared second components.

EXAMPLE 16

A catalyst was prepared in the same manner as in Example 1 except that the ammonium paratungstate used in the preparation of the first component was replaced with ammonium paramolybdate [$(NH_4)_6 Mo_7O_{24} \cdot 4H_2O$].

EXAMPLES 17 AND 18

A mordenite supporting palladium or rhodium in an amount of 0.05 wt % was prepared in the same manner as in Example 1 except that the chloroplatinic acid was replaced with a nitric acid solution of palladium nitrate [$Pd(NO_3)_3$] (Example 17) or with a nitric acid solution of rhodium nitrate l$Rh(NO_3)_3$] (Example 18). Catalysts were prepared by respectively adding the above-prepared solutions to the first component prepared in the same manner as in the preparation of Pt-mordenite.

EXAMPLES 19–21

Catalysts were prepared in the same manner as in Example 1 except that the second component/first component ratio was changed from 2/98 to 0.5/99.5 (Example 19), 1/9 (Example 20) and 2/8 (Example 21).

EXAMPLES 22–24

A second component was prepared in the same manner as in Example 1 except that the amount of chloroplatinic acid was changed to 2.66 g. Then catalysts were prepared in the same manner as in Example 1 except that the second component/first component ratio was changed as in Examples 19 to 21.

TEST EXAMPLE 5

The catalysts prepared in Examples 1, 4 and 14 to 24 and Comparative Examples 1, 3 and 8 to 12 were tested for NOx removal ratios, unreacted ammonia decomposition ratios and CO removal ratios while the ammonia concentration was set at a constant rate of 280 ppm under the conditions shown in Table 7. Tables 8 and 9 show the results. The unreacted ammonia decomposition ratio was determined by the following equation.

Ammonia decomposition ratio (%) = {($NH_3$ concentration in outlet) / ($NH_3$ concentration in inlet − concentration of $NH_3$ used in NOx removal reaction)} × 100

TABLE 8

| Catalyst | Second component | First component (atomic ratio) | Mixing ratio (weight ratio) | Noble metal content (ppm) | Activities (%) NOx removal ratio | Activities (%) $NH_3$ decomposition ratio |
|---|---|---|---|---|---|---|
| Ex. 1 | 0.05% Pt-mordenite | Ti/W/V = 91/5/4 | 2/98 | 10 | 96 | 94 |
| Ex. 4 | chloroplatinic acid | Ti/W/V = 91/5/4 | — | 50 | 96 | 65 |
| Ex. 14 | 0.05% Pt-silica | Ti/W/V = 91/5/4 | 1/9 | 50 | 85 | 99 |
| Ex. 15 | 0.05% Pt-γ-alumina | Ti/W/V = 91/5/4 | 1/9 | 50 | 83 | 81 |
| Ex. 16 | 0.05% Pt-mordenite | Ti/Mo/V = 91/5/4 | 2/98 | 10 | 94 | 91 |
| Ex. 17 | 0.05% Pd-mordenite | Ti/W/V = 91/5/4 | 2/98 | 10 | 97 | 74 |
| Ex. 18 | 0.05% Rh-mordenite | Ti/W/V = 91/5/4 | 2/98 | 10 | 96 | 66 |
| Ex. 19 | 0.05% Pt-mordenite | Ti/W/V = 91/5/4 | 0.5/99.5 | 2.5 | 98 | 48 |
| Ex. 20 | 0.05% Pt-mordenite | Ti/W/V = 91/5/4 | 1/9 | 50 | 91 | 98 |
| Ex. 21 | 0.05% Pt-mordenite | Ti/W/V = 91/5/4 | 2/8 | 100 | 88 | 99 |

TABLE 9

| Catalyst | Second component | First component (atomic ratio) | Mixing ratio (weight ratio) | Noble metal content (ppm) | Activities (%) NOx removal ratio | Activities (%) $NH_3$ decomposition ratio |
|---|---|---|---|---|---|---|
| Ex. 22 | 0.2% Pt-mordenite | Ti/W/V = 91/5/4 | 0.5/99.5 | 10 | 97 | 93 |
| Ex. 23 | 0.2% Pt-mordenite | Ti/W/V = 91/5/4 | 1/9 | 200 | 72 | 99 |
| Ex. 24 | 0.2% Pt-mordenite | Ti/W/V = 91/5/4 | 2/8 | 400 | 41 | 99 |
| CEx. 1 | — | Ti/W/V = 91/5/4 | — | 0 | 98 | 3 |
| CEx. 2 | 0.05% Pt-mordenite | inert $TiO_2$ | — | 10 | −52 | 98 |
| CEx. 3 | — | Ti/Mo/V = 91/5/4 | — | 0 | 96 | 2 |
| CEx. 4 | 0.05% Pt-silica | inert $TiO_2$ | 1/9 | 50 | −64 | 99 |
| CEx. 5 | 0.05% Pt- | inert | 1/9 | 50 | −29 | 76 |

TABLE 9-continued

| Catalyst | Second component | First component (atomic ratio) | Mixing ratio (weight ratio) | Noble metal content (ppm) | Activities (%) NOx removal ratio | Activities (%) NH₃ decomposition ratio |
|---|---|---|---|---|---|---|
| CEx. 6 | γ-alumina 0.05% Pd-mordenite | TiO₂ inert TiO₂ | 2/98 | 10 | −22 | 77 |
| CEx. 7 | 0.05% Rh-mordenite | inert TiO₂ | 2/98 | 10 | 13 | 64 |

Tables 8 and 9 clearly show that the catalyst according to Examples of the present invention showed high NOx removal ratios and high unreacted ammonia decomposition ratios as compared with the catalysts of Comparative Examples even when gas to be treated contained no CO, and that the catalyst according to the present invention is an excellent catalyst which can prevent the leak of unreacted ammonia.

What is claimed is:

1. A catalyst for purifying an exhaust gas, which comprises a first component having activity for reducing nitrogen oxides by reaction with ammonia and a second component in admixture with said first component and having activity for forming nitrogen oxide from ammonia and/or activity for forming carbon dioxide from carbon monoxide, wherein the first component is an oxide of a member selected from the group consisting of titanium-tungsten, titanium-tungsten-molybdenum, titanium-vanadium, titanium-tungsten-vanadium, titanium-molybdenum and titanium-molybdenum-vanadium and the second component is a salt of a noble metal selected from the group consisting of platinum, palladium and rhodium supported on a porous carrier selected from the group consisting of zeolite, alumina and silica, said porous carrier being supported by said first component.

2. A catalyst according to claim 1, wherein the content of the noble metal in the catalyst is greater than zero but not greater than 1,000 ppm.

3. A catalyst according to claim 1, wherein the ratio of the second component to the first component is 1/99 to 10/90.

4. A method of purifying an exhaust gas containing nitrogen oxides, which comprises:
adding ammonia to the exhaust gas;
contacting the exhaust gas with the catalyst recited in claim 1 to decompose the nitrogen oxides and unreacted ammonia.

5. A method for purifying an exhaust gas containing nitrogen oxides and carbon monoxide comprising:
injecting ammonia into the exhaust gas as an agent for reducing the nitrogen oxides; and
contacting the exhaust gas with a catalyst as recited in claim 1 to decompose the nitrogen oxides and carbon monoxide.

6. A method for purifying an exhaust gas containing nitrogen oxides, which comprises:
injecting ammonia into the exhaust gas as an agent for reducing the nitrogen oxides;
contacting the exhaust gas with a reducing catalyst for catalytic reduction of the nitrogen oxides in the presence of ammonia and, subsequently, with a second catalyst as recited in claim 1 to decompose unreacted ammonia in the exhaust gas.

7. A method for purifying an exhaust gas containing nitrogen oxides and carbon monoxide, which comprises:
injecting ammonia into the exhaust gas as an agent for reducing the nitrogen oxides; and
contacting the exhaust gas with a NOx reducing catalyst for catalytic reduction of the nitrogen oxides and, subsequently, with a catalyst as recited in claim 1 for decomposing unreacted ammonia and carbon monoxide in the exhaust gas.

8. A catalyst according to claim 1 wherein said second component is contained in pores at surfaces of said first component.

9. A catalyst according to claim 1 wherein said first component has macropores with microporous carrier particles contained within said macropores, said second component being located within the micropores of said carrier particles.

10. A method of purifying an exhaust gas according to claim 3 wherein said catalyst of claim 1 has macropores in said first component and additionally comprises microporous carrier particles contained within said macropores, said second component being located within the micropores of said carrier particles.

11. A method of purifying an exhaust gas according to claim 5 wherein said catalyst has macropores in said first component and additionally comprises microporous carrier particles contained within said macropores, said second component being located within the micropores of said carrier particles.

12. A method of purifying an exhaust gas according to claim 6 wherein said second catalyst has macropores in said first component and additionally comprises microporous carrier particles contained within said macropores, said second component being located within the micropores of said carrier particles.

13. A method of purifying an exhaust gas according to claim 7 wherein said second catalyst has macropores in said first component and additionally comprises microporous carrier particles contained within said macropores, said second component being located within the micropores of said carrier particles.

14. The method of claim 3 wherein the ratio of the ammonia added to the exhaust gas to nitrogen oxides within the exhaust gas is approximately 1.0–1.4.

* * * * *

UNITED STATES PATENT AND TRADEMARK OFFICE
CERTIFICATE OF CORRECTION

PATENT NO. : 5,409,681
DATED : April 25, 1995
INVENTOR(S) : SATO et al

It is certified that error appears in the above-indentified patent and that said Letters Patent is hereby corrected as shown below:

Col. 18, line 36, delete "3" and insert --4--; and line 59, delete "3" and insert --4--.

Signed and Sealed this

Twelfth Day of December, 1995

Attest:

BRUCE LEHMAN

*Attesting Officer*   Commissioner of Patents and Trademarks